United States Patent [19]

Chan et al.

[11] Patent Number: 4,703,375
[45] Date of Patent: Oct. 27, 1987

[54] LOW MASS TRICOMPLAINT RECORDING DEVICE FOR DOUBLE SIDED FLOPPY DISK MEDIA

[75] Inventors: John R. Chan, Fremont; Homer S. Pitner, Jr., Santa Clara, both of Calif.

[73] Assignee: Chan Industries, Inc., Santa Clara, Calif.

[21] Appl. No.: 801,143

[22] Filed: Nov. 22, 1985

[51] Int. Cl.⁴ .................... G11B 5/54; G11B 21/22
[52] U.S. Cl. .................................. 360/105; 360/99; 360/104
[58] Field of Search .................. 360/97, 99, 104, 105, 360/106, 209

[56] References Cited

U.S. PATENT DOCUMENTS

| | | | |
|---|---|---|---|
| 4,151,573 | 4/1979 | Tandon et al. | 360/104 |
| 4,206,489 | 6/1980 | Manzke et al. | 360/105 |
| 4,209,813 | 6/1980 | Bryer | 360/99 |
| 4,306,258 | 12/1981 | Higashiyama et al. | 360/99 |
| 4,349,851 | 9/1982 | Higashiyama et al. | 360/105 |
| 4,376,294 | 3/1983 | Meier et al. | 360/105 |
| 4,379,316 | 4/1983 | Krane | 360/105 |
| 4,423,449 | 12/1983 | Hasegawa | 360/105 X |

*Primary Examiner*—John H. Wolff
*Attorney, Agent, or Firm*—Claude A. S. Hamrick

[57] ABSTRACT

An improved magnetic head carriage and support apparatus including a carriage body a lower head supporting arm affixed to the carriage body and carrying a gimbaled mounted lower head, an upper arm pivotally connected to the carriage body and movable between a retracted position and a media engaging position in which a stop is engaged. The upper arm carries an upper head that is also gimbal mounted and head load is applied by a light weight flexure spring such that when the upper arm is in the media engaging position the head are free to move relative to the supporting arms as either the media moves out of it mid-plane or the carriage moves towards or away from the media midplane.

11 Claims, 8 Drawing Figures

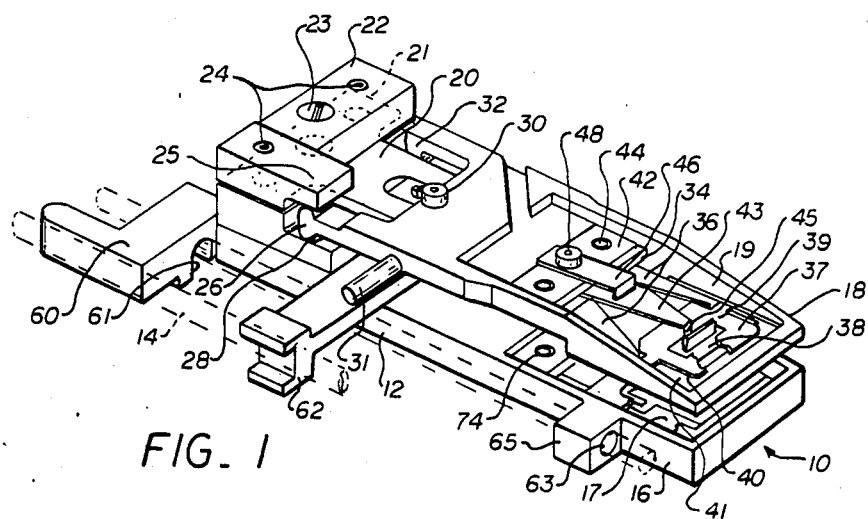
FIG_1
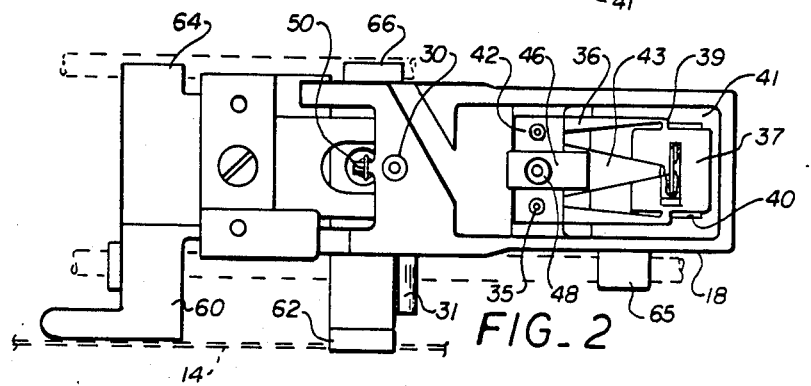
FIG_2
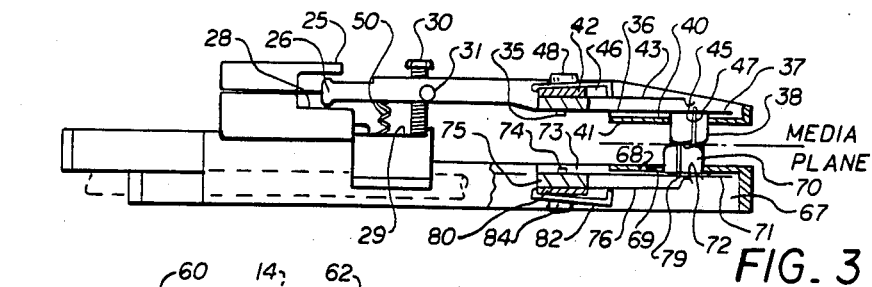
FIG_3
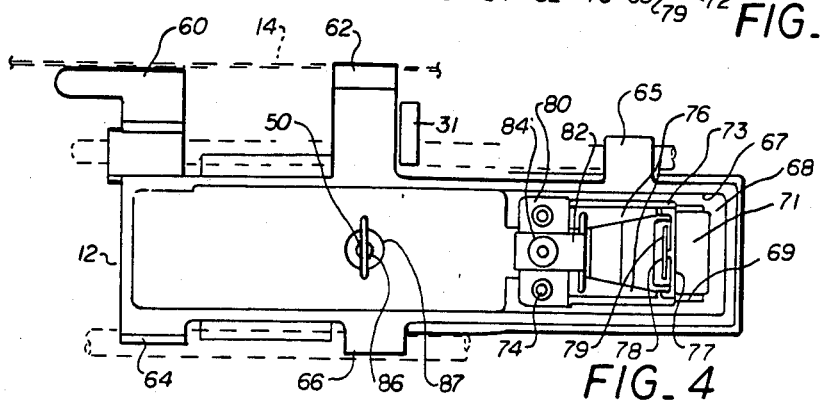
FIG_4

LOW MASS TRICOMPLAINT RECORDING DEVICE FOR DOUBLE SIDED FLOPPY DISK MEDIA

BACKGROUND OF THE INVENTION

1. Field of the Invention

The present invention relates generally to magnetic head carriage and support apparatus for floppy disk drives and the like, and more particularly, to an improved carriage and head suspension mechanism wherein the spring forces exerted upon a pair of read/write heads is limited to the forces applied by small light-weight load springs, and the inertial forces are limited to those introduced by the mass of the heads and suspensions alone.

2. Description of the Prior Art

Conventional magnetic read/write head carriage devices have in the prior art been embodied in numerous forms including those types which are intended to carry a single head for reading one side of a floppy disk and those designed to carry dual heads intended to allow both sides of the disks to be read and written to. The most popular type in the latter category has been those which are of the type disclosed in the U.S. Pat. No. 4,151,573, S. L. Tandon et al., in which the lower head is rigidly attached to the carriage and caused to penetrate the plane of the recording media. The other head is gimbal-mounted to a flexure attached to a spring loaded arm that, when rotated into its operable position, serves to apply a predetermined force to the upper head sufficient to obtain media compliance.

Problems associated with such devices are: (1) the lower head must be positioned to at all times penetrate the plane of the media at close tolerance, thereby requiring inordinately tight manufacturing process controls; (2) variations of head load force due to the weight of the upper head support arm with respect to the drive mounting position; and (3) the effects of head inertia on the media. The effect of item (1) above is that it causes an unacceptable ratio of design parameter sensitivity to manufacturing process control. Items (2) and (3) tend to reduce potential media life.

One attempt to avoid the need for having one head pierce the nominal mid-plane of the media is disclosed in the U.S. Pat. No. 4,209,813, to P. S. Bryer, wherein two gimbal-mounted heads are biased into engagement with opposite sides of the media. However, in this device the heads are supported by flexures that are biased to normally move the heads away from each other, and spring biased load arms are used to load the heads onto the media.

A problem common to both of the above described prior art devices is that since the head load is applied by the spring (or springs) that bias the head carrying arm, or arms, into their media engaging position, movement of the head will bring into play not only the forces due to the inertia of the head, but also those associated with the mass of the load arm, or arms. These forces likewise can have a substantial influence on the life of the media.

SUMMARY OF THE PRESENT INVENTION

It is therefore an objective of the present invention to provide a novel head carriage and support structure in which a pair of magnetic read/write heads are suspended and carried in such a fashion that they are free to move independent of the carriage load arms and with the media as it moves in and out of its nominal mid-plane.

Another objective of the present invention is to provide an apparatus of the type described wherein the read/write heads are free to move upwardly and downwardly relative to the carriage structure as the carriage moves up or down relative to the nominal mid-plane of the media.

Still another objective of the present invention is to provide apparatus of the type described wherein the forces applied to the media due to structural inertia are limited to the mass of the read/write heads and suspensions alone..

Briefly, a preferred embodiment of the present invention includes a suitably driven carriage having a lower head supporting arm that is rigidly affixed to and forms an integral part of the carriage body used to carry a gimbal-mounted lower head, and an upper arm that is pivotally connected to the carriage and movable between a retracted position and a media engaging read/write position in which a stop is engaged. The upper arm carries an upper head that is gimbal-mounted, and head load is applied by a light weight flexure spring. In operation, with the upper arm lowered, the upper head and the lower head are loaded against the media, and the heads are free to move relative to the upper and lower arms as either the media moves out of its mid-plane or the carriage moves towards or away from the media mid-plane. During such occurrences the head pair will follow the media, remaining in compliance therewith.

An important advantage of the present invention is that it maintains constant head load forces when the drive is mounted in either vertical or horizontal disposition, and thereby increases the wear-life of the recording media due to the fact that only forces relating to the mass of the heads act upon the media.

These and other objects and advantages of the present invention will no doubt become apparent to those skilled in the art after having read the following detailed description of a preferred embodiment which is illustrated in the several figures of the drawing.

IN THE DRAWING

FIG. 1 is a perspective view illustrating a magnetic read/write head carriage and support structure in accordance with the present invention;

FIG. 2 is a top plan view thereof;

FIG. 3 is a side elevational view thereof, partially broken to show various details;

FIG. 4 is a bottom plan view thereof;

DETAILED DESCRIPTION OF THE PREFERRED EMBODIMENT

Figure 5:
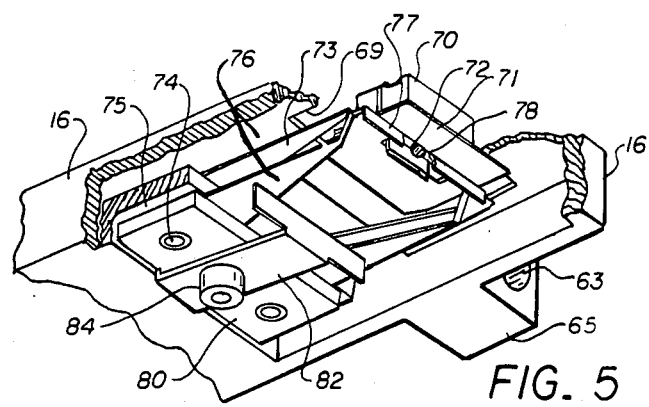
FIG. 5 is a perspective view of the lower head support arm broken to illustrate various details of the preferred embodiment.

Referring now to FIGS. 1-4 of the drawing, a head carriage and support structure 10 in accordance with the present invention is illustrated and includes a carriage body 12 which is driven by a band drive 14, lead screw or other well known drive means. Formed integral with body 12 is a lower head support arm 16 having a head suspension receiving cavity 17 provided therein. Pivotally attached to carriage body 12 is an upper head support arm 18 also having a head suspension receiving cavity 19 formed therein. Arm 19 is attached to carriage body 12 by means of a spring hinge 20 partially shown in phantom by the dashed lines 21 and attached to the carriage by means of hold down member 22 and screw 23. Alignment of hinge 20, and member 22 is accomplished by means of pins 24 which are molded into the top of and extend upwardly from body 12. Hinge 20 permits pivoting action in the vertical direction between a retracted or unloaded position (not depicted) and a media engaging or loaded position as shown in FIGS. 1 and 3, but prevents any lateral or longitudinal motion of arm 18.

Extending forwardly from hold down 22 is a cantilevered tab 25, the bottom surface of which is engaged by the top of a bearing member 26 forming a part of arm 18. As indicated, the lower bearing surface of member 26 rests upon the carriage surface 28 and the upper bearing surface engages the bottom surface of tab 25. Carriage surface 28 also cooperates with an adjustable down-stop screw 30 to limit the downward rotation of arm 18. Note that on the opposite side of arm 18 a second bearing member 32 is provided which also rests upon surface 28. Bearing members 26 and 32 cooperate with down-stop screw 30 to form three-point support for positioning arm 18. Arm 18 is normally biased downwardly into the position shown and against down-stop 30 by a load spring 50 (see FIG. 3). A lift tab 31 extends laterally from arm 18 to provide a means for lifting the arm upwardly.

Attached to the bottom of a web 34 that forms a part of arm 18 and aligned by molded pins 35 (FIG. 2) is an upper head suspension structure including a pair of flexible arms 36 and a head attachment plate 37. Plate 37 is attached to arms 36 by means of integrally formed, laterally extending segments of flexure shown at 39 and is free to rock about a transverse axis passing therethrough. The underside of plate 37 is adapted to carry an upper read/write head 38 which is bonded or otherwise fastened thereto using well known methods. Note that a rectangular aperture 40, through which head 38 extends, is provided in a second web 41. The longitudinal dimension of aperture 40 is made smaller than that of plate 37 so as to support the plate and attached head when arm 18 is rotated into its retracted position. Disposed immediately above web 34 is a clamping member 42 which secures a head load spring 43 in position. Alignment of spring 43 is accommodated by molded pins 44. The distal end 45 of spring 43 bears against an upstanding dimple (not shown) in plate 37 and provides loading forces to the top side of plate 37 and head 38. The head load applied by load spring 43 is selectively adjusted by means of a head load clamp 46 and associated adjustment screw 48.

Referring now additionally to FIG. 4, which is a bottom plan view of the carriage and support structure 12, and FIG. 5, which is a partial perspective view taken from beneath and broken to illustrate various details of the lower head support arm 16 and associated head suspension, it is evident that carriage member 12 includes drive band attachment appendages 60 and 62 extending from one side thereof. A third appendage 65 is similarly provided having a guide rod receiving opening 63 formed therein. Appendage 60 is also provided with a guide rod clearance opening 61. Each such opening is adapted to include an appropriate rail engaging bushing (not shown).

As illustrated, the lower arm 16 is likewise provided with a molded head and suspension receiving cavity 67 having a web 68 with a rectangular aperture 69 formed therein for receiving the lower head 70. Head 70 is affixed to and supported by a gimbaled suspension which is substantially identical to that used in upper arm 18, and includes a rectangular plate 71 having a dimple 72 formed therein together with a suspension means including a pair of arms 73. The suspension is aligned by molded pins 74 and is affixed to a slightly recessed surface 75 using a suitable adhesive.

The lower head load spring is also similar to that used in the upper arm except that it is modified to include dual flexures 76 joined at their distilled ends by a cross beam 77 having a contact foot 78 (FIG. 4) which engages the dimple 72. The purpose of this dual flexure configuration is to provide a means for clearing the head coils (not shown) attached to the magnetic plates 79 of head 70. As in the upper arm, the lower load spring is clamped in place by plate 80 and the spring load is selected by an adjustable screw 84 and clamping member 82. Note that a bore 86 is provided in carriage member 12 to provide a means of lower attachment of the tension spring 50. Actual attachment might for example be effected by a cross pin 87.

Figure 7:
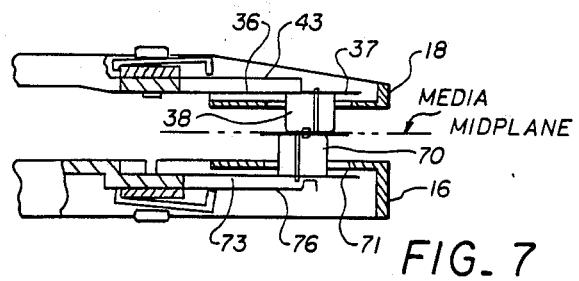

In operation, prior to insertion of a floppy disk into a drive including the present invention, means not shown will have engaged the lift tab 31 and rotated arm 18 into its retracted position separating the upper and lower heads 38 and 70 respectively. As arm 18 is lifted and rotated toward its unloaded position, plate 37 will be depressed by load spring 43 into engagement with the top of web 40 which serves as a stop or limit means for limiting the downward motion of head 38. Similarly, the lower plate 71 carrying head 70 will be forced upwardly by load spring 76 and into a limit position engaging a stop formed by the bottom surface of web 68. The two heads are thereby constrained against further movement relative to their respective carriage arms. The media is then inserted into the space between the arms, and upon being lowered, engages head 70 causing it to be depressed against the influence of load spring 76. Arm 18 is then lowered until stop 30 (FIG. 3) engages surface 29 and limits further rotation of the arm. At such time, the arm 18 is said to be in its loaded position. However, prior to engagement of stop 30 with surface 29, head 38 will engage the upper media surface and, as the arm continues to rotate, will cause plate 37 to be lifted out of its resting engagement with web 41. At such time, assuming that the media lies in it nominal mid-plane, and assuming that the carriage is properly aligned with the media mid-plane, the head carrying plates 37 and 71 will be positioned as illustrated in FIG. 7 and both of the heads will be sprung and in full compliance with the media. At this point, reading of or writing to the media may be commenced. If thereafter, either the media or carriage should move upwardly or downwardly relative to the nominal media mid-plane, both heads will follow, remaining in compliance, and head motion will be restrained solely by the load forces applied by lead springs 43 and 76 and the masses of the respective heads. The mass of the arms 16 or 18 will have no effect on the head-to-media loading.

Figure 6:
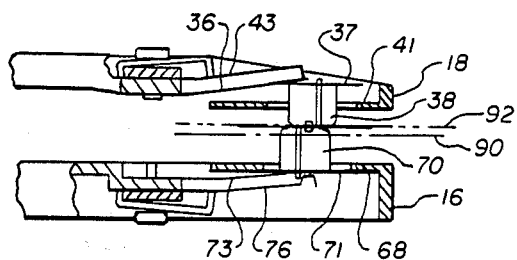
FIGS. 6, 7 and 8 are partial broken side views illustrating operation of the preferred embodiment.

In FIG. 6 of the drawing, the case is illustrated where either the media has moved upwardly relative to it nominal mid-plane, represented by the line 90, or in the alternative, the carriage has moved downwardly relative to the media mid-plane represented by the line 92.

Figure 8:
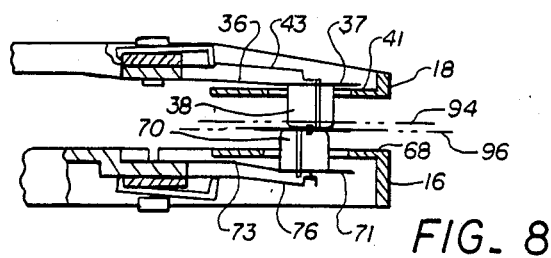

Similarly, in FIG. 8, the case is illustrated where either the media has moved downwardly relative to its nominal mid-plane, illustrated by the line 94, or the carriage has moved upwardly relative to the media mid-plane represented by the line 96. In either case it will be appreciated that the present invention provides for a relatively substantial degree of freedom of head motion, normally in the range of ±0.015 inch, without bottoming out against one of the webs 41 or 68. The advantages of allowing such freedom of motion will be well recognized by those skilled in the art. Furthermore, it will be recognized that the present invention is not limited to use in the horizontal disposition illustrated, and the carriage 10 could also be mounted vertically or at any other angular disposition found to be desirable.

Although the present invention has been described above in terms of a single embodiment, it is contemplated that certain alterations and modification thereof may become apparent of those skilled in the art. For example, the lower arm 16 could be pivotally attached to the carriage body in a similar manner to that in which upper arm 18 is attached. It is therefore intended that the following claims be interpreted as covering all such alterations and modifications as fall within the true spirit and scope of the invention.

What is claimed is:

1. An improved magnetic head carriage and suspension apparatus, comprising:
    a carriage body including means for engaging said body, and a guide which defines a predetermined path over which said apparatus is to move relative to a floppy disk media, and means for attaching said body to a drive means for moving said apparatus along said predetermined path:
    a first magnetic read/write head;
    a first head support arm attached to said body and having means forming a first stop;
    first suspension means affixed to said first arm and adapted to carry said first head between a first limit position defined by engagement with said first stop, and a sprung position out of engagement with said first stop;
    a first load spring affixed to said first arm and adapted to resiliently engage said first suspension means and to exert a predetermined loading force thereupon tending to bias said first head towards said first stop;
    a second magnetic read/write head;
    a second head support arm pivotally attached to said body and rotatable between a media engaging position and a retracted position, said media engaging position being defined by a second stop means which limits motion of said second arm in one direction relative to said body, said second arm having means forming a third stop;
    second suspension means affixed to said second arm and adapted to carry said second head between a second limit position, defined by engagement with said third stop, and a sprung position out of engagement with said third stop; and
    a second load spring affixed to said second arm and adapted to resiliently engage said second suspension means and to exert a predetermined loading force thereupon tending to bias said second head toward said third stop;
    whereby when said second arm is in said retracted position, said first and second heads are respectively supported and biased into predetermined fixed positions relative to said first and second arms, as determined by engagement with said first and third stops, and when said second arm is in said media engaging position, said first and second heads are caused to engage opposite sides of said media and to be moved out of engagement with said first and third stops and into said sprung positions with loading forces determined solely by said first and second load springs.

2. An improved magnetic head carriage and suspension apparatus as recited in claim 1 wherein said first arm is fixed in position relative to said body.

3. An improved magnetic head carriage and suspension apparatus as recited in claim 1 wherein said second arm is pivotally attached to said body by a hinge means and is resiliently biased into said media engaging position by an additional spring means attached to said first arm and said body.

4. An improved magnetic head carriage and suspension apparatus as recited in claim 3 wherein said second stop means is formed by a part of said body and an adjustable stop carried by said first arm for engaging said second stop means and defining said media engaging position.

5. An improved magnetic head carriage and suspension apparatus as recited in claim 4 wherein said second arm includes first and second bearing surfaces respectively disposed on opposite sides on said hinge means and adapted to engage bearing surfaces formed on said body, whereby said first and second bearing surfaces cooperate with said adjustable stop to form a three-point support for accurately determining the disposition of said second arm relative to said body when said second arm is in said media engaging position.

6. An improved magnetic head carriage and suspension apparatus as recited in claim 5 wherein said first and second suspension means form gimbaled support structures adapted to allow freedom of rotation of said first and second heads about respective sets of two orthogonal axes.

7. An improved magnetic head carriage and suspension apparatus as recited in claim 6, and further comprising:
    first and second adjustable clamping means for respectively engaging said first and second load springs to permit adjustment of the load forces exerted thereby.

8. An improved magnetic head carriage and suspension apparatus as recited in claim 1 wherein said first suspension means includes a gimbaled support structure adapted to allow freedom of rotation of said first head about two orthogonal axes.

9. An improved magnetic head carriage and suspension apparatus as recited in claim 8 wherein said second suspension means includes a gimbaled support structure adapted to allow freedom of rotation of said second head about two orthogonal axes.

10. An improved magnetic head carriage and suspension apparatus as recited in claim 9 wherein said first arm is fixed in position relative to said body.

11. An improved magnetic head carriage and suspension apparatus as recited in claim 1, and further comprising:
    first and second adjustable clamping means for respectively engaging said first and second load springs to permit adjustment of the load forces exerted thereby.

* * * * *